United States Patent [19]

Dussert et al.

[11] Patent Number: 5,368,739
[45] Date of Patent: Nov. 29, 1994

[54] ACTIVATED CARBON OXIDIZED BY AIR AT NEAR AMBIENT TEMPERATURES FOR THE CONTROL OF PH AND IN WATER TREATMENT APPLICATIONS

[75] Inventors: Bertrand W. Dussert; Richard A. Hayden; John R. Lutchko, all of Pittsburgh, Pa.; Kishio Yoshino; Satoru Hisaki, both of Tokyo, Japan; Fujito Ehara, Kanagawa, Japan

[73] Assignee: Calgon Carbon Corporation, Pittsburgh, Pa.

[21] Appl. No.: 115,214

[22] Filed: Sep. 1, 1993

Related U.S. Application Data

[63] Continuation-in-part of Ser. No. 60,590, May 11, 1993.

[51] Int. Cl.⁵ .................................................. C02F 1/28
[52] U.S. Cl. ..................................... 210/660; 210/691; 210/694
[58] Field of Search ............... 210/694, 681, 660, 691; 502/416, 430, 432, 433, 434

[56] References Cited

U.S. PATENT DOCUMENTS

| | | | |
|---|---|---|---|
| 4,111,842 | 9/1978 | Van Montfoort et al. | 252/447 |
| 4,154,704 | 5/1979 | Vinton et al. | 252/444 |
| 4,158,643 | 6/1979 | Sinha | 252/447 |
| 4,185,082 | 1/1980 | Sinha | 423/437 |
| 5,021,164 | 6/1991 | Gay | 210/694 |

*Primary Examiner*—Cynthia L. Nessler
*Attorney, Agent, or Firm*—Cindrich & Titus

[57] ABSTRACT

An activated carbon oxidized by air or oxygen at near ambient temperatures having a contact pH between 7.6 and 8.5 for use in water treatment systems to prevent pH excursions during operation of the system.

3 Claims, 2 Drawing Sheets

ACTIVATED CARBON OXIDIZED BY AIR AT NEAR AMBIENT TEMPERATURES FOR THE CONTROL OF PH AND IN WATER TREATMENT APPLICATIONS

CROSS-REFERENCE TO OTHER APPLICATION

This is a continuation-in-part of Ser. No. 08/060,590 filed May 11, 1993.

FIELD OF THE INVENTION

The present invention relates to a process for the control of pH excursions that occur during the treatment of aqueous systems by granular activated carbon. More particularly, this invention relates to the control of pH by an activated carbon oxidized by air or oxygen at near ambient temperatures.

BACKGROUND OF THE INVENTION

In the start-up phase of the treatment of aqueous systems by activated carbon, it is typical to experience unacceptable increases in the pH of the effluent. These high levels of pH can last from 200 to 400 bed volumes, or several days of initial operation. The effect has also been experienced for granular activated carbons (GAC) already on-line and subjected to sudden changes in influent water chemistry (e.g. pH), or following their regeneration by chemical or thermal processes. When these spikes occur, the treated water does not meet the standards for distribution to the customer or discharge to the environment. This problem can lead to a significant loss in production, environmental problems, substantial fines, customer dissatisfaction, or expensive and tedious remedial actions.

The pH excursion phenomenon has been found to occur for various types of water treatment applications such as municipal surface water, wastewater, industrial process water, ground water, and point-of-use home water filter treatment applications. It has been found to exist using various types of granular activated carbons such as those produced from bituminous coal, subbituminous coal, wood, coconut, and peat feedstocks, or those which are acid-washed prior to use.

The presence of these pH excursions has been documented for many years, but has received greater attention recently due to increased monitoring. Little or nothing has been done to prevent or remedy the problem. The excursions have been largely tolerated because no solution was known to exist. Because of the growing concern for the environmental problems associated with these excursions as well as the economic losses, the greater knowledge in the use of activated carbon systems, and the stricter standards for the supply or discharge of water, it is an object of the invention to provide a method for eliminating them. Accordingly, it is an object of the present invention to provide an oxidized activated carbon that is useful in controlling pH excursions during the treatment of aqueous systems.

SUMMARY OF THE INVENTION

Generally, the present invention comprises the use of an oxidized activated carbon to prevent the occurrence of pH excursions during the purification of water. Various methods of oxidation can be used including the use of oxidizing acids such as nitric acid, oxidizing agents such as ozone and hydrogen peroxide, and high temperature oxidation processes. It is generally preferred to expose a wetted granular activated carbon to air or oxygen at near ambient temperatures.

The oxidized activated carbon is characterized by a reduced contact pH (contact pH of activated carbon, as used herein, refers to the pH of a sodium sulfate solution after a 30 minute contact time with the activated carbon. This method is described hereinafter under Analytical), in particular a contact pH less than 8.5 but greater than 7.6. The oxidized activated carbon of the present invention is used in adsorption/filtration systems for the purification of aqueous systems. Moreover, the novel oxidized activated carbon can be employed to prevent pH excursions that would otherwise occur 1) in the start-up of granular activated carbon systems, 2) following sudden changes in influent water chemistry, and 3) following chemical or thermal regeneration. Other advantages of the present invention will become apparent from a perusal of the following description of presently preferred embodiments taken in connection with the accompanying drawings.

PRESENTLY PREFERRED EMBODIMENTS

Experimental

Figure 1:
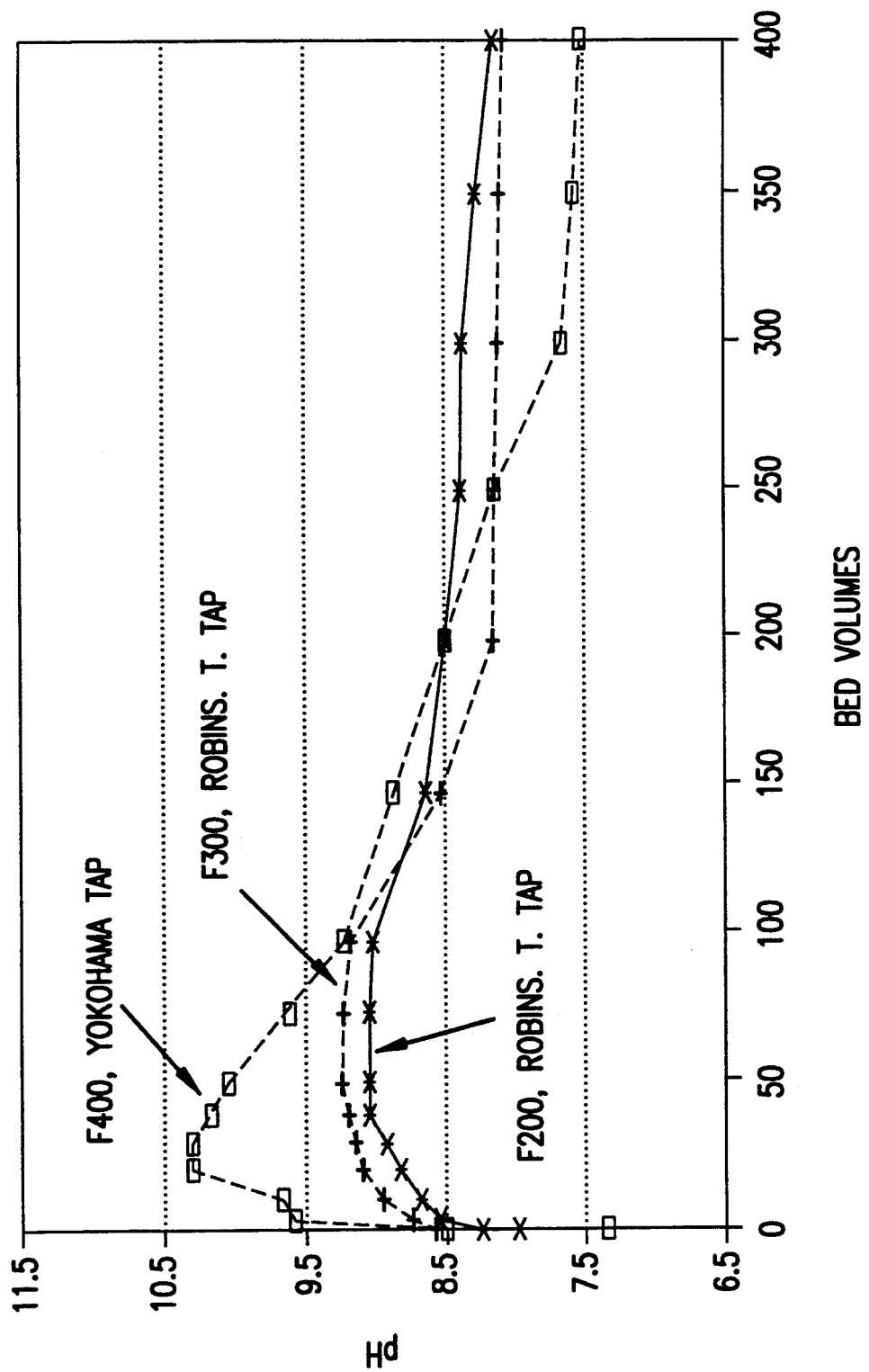
FIG. 1 is a plot of the pH evolution of effluents versus the number of bed volumes processed for three virgin, non-oxidized activated carbons (Filtrasorb 200, 300, and 400) and two city waters (Robinson Township, Pa., and Saka-e-Ku, Yokohama City, Japan).

Dynamic column testing was performed to determine the profiles of pH in the GAC-treated water. Tests were conducted with a one (1) inch inside diameter, six (6) inch long Pyrex glass column. The column was loaded with 25 g of granular activated carbon. City water was run through the column using an empty bed contact time (EBCT) ranging from approximately 3.5 to 5.0 min. Each test was run continuously for approximately one day in order to process up to 400 bed volumes of water. Samples of the influent and effluent were continuously monitored for pH with an in-line pH probe.

All oxidized carbons were washed with distilled/deionized water prior to loading the column and in order to remove fines. Wetting of the virgin, non-oxidized carbon was accomplished by either soaking in tap water for 24 hours or boiling in deionized water for 15 min.

Analytical

As used herein, the contact pH value of a given activated carbon was determined by adding 25 g of GAC into a 80 mg $SO_4^-$/L sodium sulfate solution prepared in Ultrapure Milli-Q Plus water (Milli-Q system, Millipore Corp., Bedford, Mass.). The solution was gently stirred, and the solution pH was determined after a contact time of thirty (30) minutes. This value was used as a simple analytical tool for the prediction of pH excursions.

Water Sources

Two city waters were used for this study: (1) Robinson Township (Pa.) city (tap) water, and (2) Saka-e-Ku, Yokohama city (tap) water.

Activated Carbons

Tests were performed with five coal-based granular activated carbons. Four of them (Filtrasorb 300, 400, 816, and OL) are major Calgon Carbon liquid-phase products (drinking or wastewater treatment, and process purification). The final one, BPL 4X10, is a gas-phase product that was investigated to determine the impact of the particle size on the oxidation process. Adsorption and physical properties of these activated carbons are given in Table 1.

TABLE 1

Specifications of granular activated carbons used in the tests.

| Carbon type | F-400 | F-300 | F-200 | F816 | OL | BPL 4X10 |
|---|---|---|---|---|---|---|
| Mesh Size, U.S. Sieve Series | 12X40 | 8X30 | 12X40 | 8X16 | 20X50 | 4X10 |
| Apparent Density, g/mL* | 0.462 | 0.524 | 0.564 | 0.536 | 0.475 | 0.491 |
| Abrasion Number, min. | 75 | 75 | 75 | 75 | 70 | NS |
| Iodine Number, min. | 1000 | 900 | 850 | 900 | 1050 | 1050 |
| Molasses Number, min. | 230 | 200 | 170 | 200 | 200 | NS |
| Ash, max., % | 10 | 9 | 8 | 9 | 8 | 8 |
| Moisture, max., % | 2 | 2 | 2 | 2 | 2 | 2 |

*actual measurement
NS: not specified

Moisture content, molasses number, iodine number, ash, apparent density, particle size distribution, and abrasion number are determined according to Calgon Carbon test methods numbers 1, 3, 4, 5, 7, 8, and 9, respectively.

Carbon Oxidation According To The Invention

Oxidation studies were conducted with a five (5) cm inside diameter, 1 meter long acrylic column, a $2\frac{7}{8}$ inch inside diameter, 1 foot long polyvinyl chloride (PVC) column, and a $1\frac{1}{2}$ inch inside diameter, 6 inch long aluminum column. A volume of virgin activated carbon ranging from 0.15 to 1.0L was placed in the column and soaked with approximately one (1) bed volume of city (tap) water or deionized water for 24 hours to wet and degas the carbon. The carbon bed was then drained. The carbon was oxidized with air or oxygen at flow rates between 0.5 and 10.0L/min/L of carbon, and for a time greater than seven (7) hours, but less than 25 hours. Experiments were performed at temperatures at or between ambient and 35 degrees C. Increasing the temperature from ambient to 35 degrees C. was found to enhance the rate of reaction, and consequently to decrease the time required for the obtainment of a similar product.

Oxidized carbons were also prepared by placing wet carbons (60 to 500 g) of different moisture contents (20 to 45%) in a 1.0L volume beaker covered with aluminum foil and vented to the atmosphere, or in a stainless steel drying pan and directly exposed to atmospheric air. Under these conditions, the carbon was oxidized by air for a time greater than 30 hours, but less than 340 hours.

ACTIVATED CARBON OXIDIZED BY OXYGEN AT NEAR AMBIENT TEMPERATURES FOR THE PREVENTION OF PH EXCURSIONS IN WATER TREATMENT APPLICATIONS

Significant pH excursions were found when various types of water were processed through granular activated carbons typically used for water treatment applications. This is illustrated in FIG. 1 for three activated carbons (Filtrasorb 200, 300, and 400, Calgon Carbon Corp., Pittsburgh, Pa.) and two city waters (Robinson Township, Pa., and Saka-e-Ku, Yokohama City, Japan). These three products are typical granular activated carbons used for drinking water treatment applications. Effluent pH values were above the Safe Drinking Water Act Secondary Maximum Contaminant Level (8.5) for more than 150 bed volumes. Effluent pH values of F-200, F-300, and F-400, reached a maximum of 9.2, 9.3, and 10.4, respectively, while influent pH values were 8.0, 7.8, and 7.4, respectively.

The major characteristics of the pH excursions have been described in patent application Ser. No. 08/060,590. In summary, excursions were found to be triggered by the presence of anions in the water, such as sulfate, chloride, and nitrate ions. pH excursions were accompanied by a partial anion removal from the solution. The extent of the excursions and consequently of the uptake of anions by activated carbon were dependent on the type of activated carbon and the water quality parameters such as pH and ionic strength. However, for a given carbon, the effect was similar in intensity and duration in the range of pH and ionic strength encountered in most natural waters.

It was also found that granular activated carbons characterized by a contact pH value greater than 8.5 did trigger significant pH excursions when placed on-line for water treatment. The intensity and duration of the excursions were directly related to the contact pH value: the higher the contact pH value, the greater the extent of the excursion.

All activated carbon products tested in the present study are characterized by contact pH values greater than 10.5 (Table 2), and therefore exhibited significant pH excursions when placed on-line for water treatment, as seen in FIG. 1 for F-200, F-300, and F-400.

The contact pH of the carbon can be altered by an oxidation treatment. A high-temperature oxidation, successful in eliminating pH excursions, has been described previously in patent application Ser. No. 08/060,590.

Another oxidation method is the object of the present invention. Several bituminous based activated carbons (F-200, F-300, F-400) were oxidized by air or oxygen at temperatures at or between ambient and 35 degrees C., and according to the procedure described above. After treatment, the carbons were analyzed for their resulting modified contact pH and conventional column tests were conducted.

Contact pH's are presented in Table 2 for all carbons tested, before and after treatment.

TABLE 2

Contact pH's of non-oxidized virgin and air-oxidized activated carbons.

| GAC type | Contact pH before treatment | Contact pH after treatment |
| --- | --- | --- |
| F-400 | 10.70 | 8.4 |
| F-300 | 10.95 | 8.4 |
| F-200 | 10.59 | 8.0 |
| F816 | 10.66 | 8.4 |
| OL | 11.03 | 8.3 |
| BPL | 10.84 | 8.1 |

In these tests, 500 g of F-200 activated carbon were wetted in one bed volume of deionized water, placed in a stainless steel pan and exposed to atmospheric air for 30 hours. All the other carbons were wetted, placed in a 1½ inch inside diameter, 6 inch long polyvinyl chloride (PVC) column, and air was fed through the column for 8 hours at a flowrate of 10L/min/L of carbon. After this time, the inlet airflow of the column was discontinued and the carbons were analyzed for pH profiles and contact pH's. One carbon, BPL, was placed in a stainless steel drying pan and further oxidized by additional exposure to atmospheric air for two hours.

Figure 2:
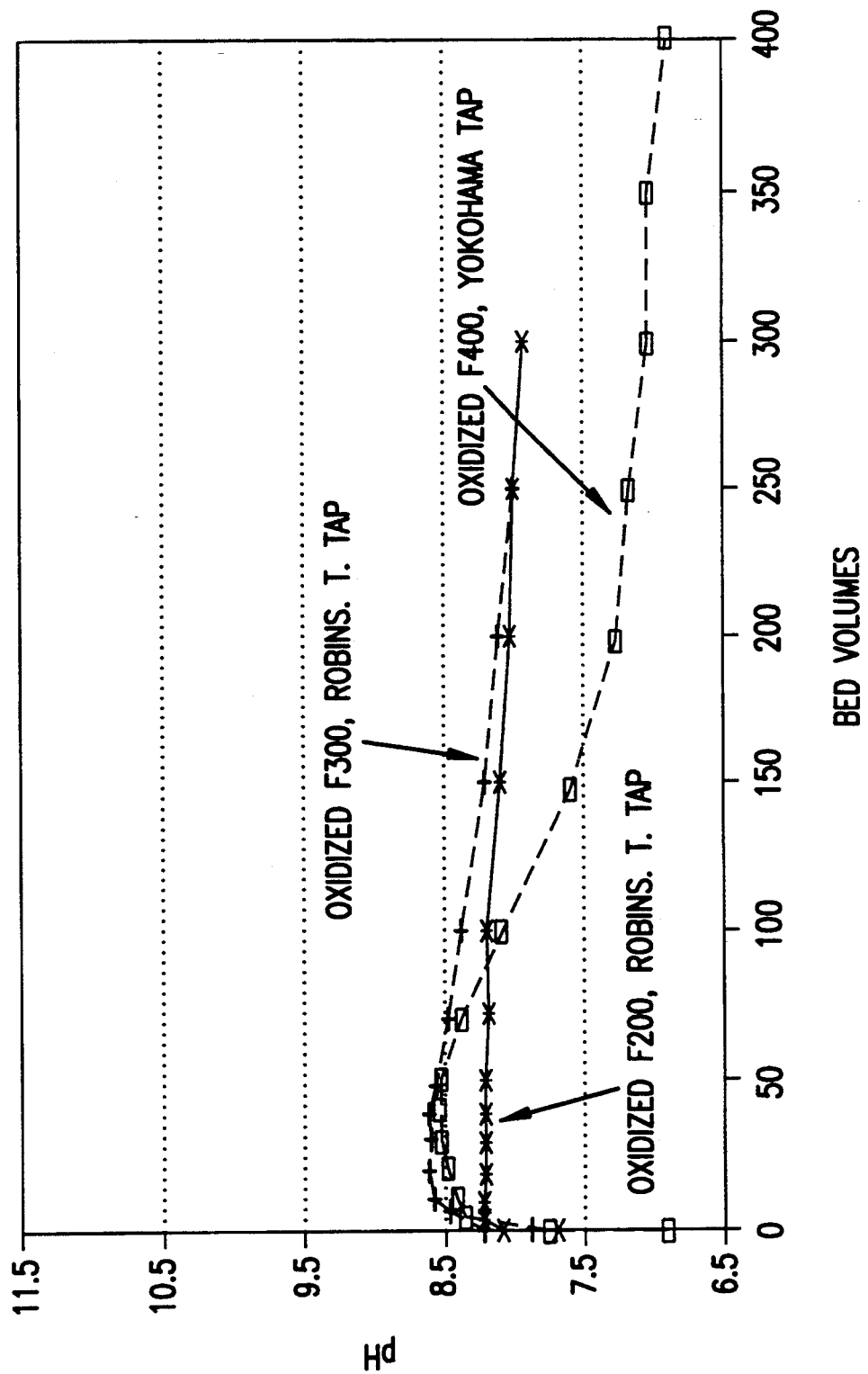
FIG. 2 is a plot of the pH evolution of effluents versus the number of bed volumes processed for three oxidized activated carbons (Filtrasorb 200, 300, and 400) and two city waters (Robinson Township, Pa., and Saka-e-Ku, Yokohama City, Japan).

The contact pH's of these air-oxidized carbons dropped significantly and were below 8.5, demonstrating a successful treatment. The pH profiles of the treated carbons are presented in FIG. 2 for three carbons, F-200, F-300, and F-400, and using two city waters (Saka-e-ku, Yokohama City, Japan, and Robinson Township, Pa.). No significant pH excursions occurred with air-oxidized activated carbons. Maximum effluent pH values for air-oxidized F-200, F-400, and F-300 carbons were 8.2, 8.6, and 8.7, respectively, while influent pH values were 7.7, 6.9, and 7.9, respectively. It must be noted that effluent pH values could be lowered, if necessary, by increasing the exposure time to air during treatment.

While presently preferred embodiments of the invention are described in particularity, the invention may be otherwise embodied within the scope of the appended claims.

What is claimed is:

1. In a method for treating aqueous systems by activated carbon adsorption, the improvement comprising preventing pH excursions during operation of said aqueous systems by contacting said aqueous systems with an activated carbon oxidized by air or oxygen, said activated carbon having a contact pH below 8.5.

2. In a method of claim 1 wherein said activated carbon is oxidized at temperatures at or between ambient and 35 degrees C.

3. In a method of claim 5 wherein said oxidized carbon has a contact pH between 7.6 and 8.5.

* * * * *